(12) United States Patent
Sasaki et al.

(10) Patent No.: US 7,642,761 B2
(45) Date of Patent: *__Jan. 5, 2010__

(54) POWER SUPPLY CIRCUIT

(75) Inventors: Yoshikazu Sasaki, Kyoto (JP); Isao Yamamoto, Kyoto (JP); Masao Yonemaru, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/256,861

(22) Filed: Oct. 23, 2008

(65) Prior Publication Data

US 2009/0045789 A1     Feb. 19, 2009

Related U.S. Application Data

(62) Division of application No. 11/810,940, filed on Jun. 7, 2007, now Pat. No. 7,456,619.

(30) Foreign Application Priority Data

Jun. 9, 2006    (JP)    ............................. 2006-160781

(51) Int. Cl.
    *G05F 1/00* (2006.01)

(52) U.S. Cl. .................................................. 323/274

(58) Field of Classification Search ................. 323/268, 323/270, 271, 273–275, 280–285
See application file for complete search history.

(56) References Cited

U.S. PATENT DOCUMENTS

| | | | | |
|---|---|---|---|---|
| 4,806,842 A | * | 2/1989 | Bittner | ........................ 323/222 |
| 5,966,003 A | * | 10/1999 | Takimoto et al. | ............. 323/224 |
| 6,046,577 A | * | 4/2000 | Rincon-Mora et al. | ....... 323/282 |
| 6,310,467 B1 | * | 10/2001 | Sauer | .......................... 323/273 |
| 6,703,813 B1 | * | 3/2004 | Vladislav et al. | ............. 323/270 |
| 6,703,815 B2 | * | 3/2004 | Biagi | ........................... 323/280 |
| 6,804,126 B2 | * | 10/2004 | Lucas | ....................... 363/21.01 |
| 6,965,223 B1 | * | 11/2005 | MacLean et al. | ............. 323/284 |
| 7,208,927 B1 | * | 4/2007 | Nguyen | ....................... 323/282 |
| 7,248,026 B2 | * | 7/2007 | Ritter | ........................... 323/281 |
| 7,253,596 B2 | * | 8/2007 | Yamamoto et al. | ........... 323/281 |
| 7,456,619 B2 | * | 11/2008 | Sasaki et al. | ................. 323/274 |
| 2004/0027106 A1 | * | 2/2004 | Martins | ....................... 323/282 |
| 2007/0063736 A1 | * | 3/2007 | Biagi | ............................ 326/82 |

FOREIGN PATENT DOCUMENTS

JP    8-272461    10/1996

* cited by examiner

*Primary Examiner*—Matthew V Nguyen
*Assistant Examiner*—Jue Zhang
(74) *Attorney, Agent, or Firm*—Cantor Colburn LLP

(57) ABSTRACT

A power supply circuit includes a standard voltage generator; a regulator to control an output voltage, and to be capable of being switched ON/OFF; a capacitor in parallel between the standard voltage generator and the regulator; a discharging circuit including a first switch and a second switch configured to discharge electrical charges from the capacitor via the second switch while the regulator is in an OFF state; and a starting controller configured to transmit a signal for controlling the first switch and the second switch. The first switch is connected in series between the standard voltage generator and the regulator. The second switch has one end connected to a connection node between the first switch and the regulator, and has another end connected to a ground. When the first switch is in OFF state, the second switch is turned to ON state while the regulator is in OFF state.

6 Claims, 3 Drawing Sheets

POWER SUPPLY CIRCUIT

CROSS REFERENCE TO RELATED APPLICATION

The present application is a continuation application of U.S. patent application Ser. No. 11/810,940, filed on Jun. 7, 2007, the entire contents of which are incorporated herein by reference and priority to which is hereby claimed. application Ser. No. 11/810,940 claims priority to Japanese Patent Application 2006-160781, filed Jun. 9, 2006 the entire contents of which are incorporated herein by reference, and priority to which is hereby claimed.

BACKGROUND OF THE INVENTION

1. Field of the Invention

The present invention relates to a power supply circuit including a regulator capable of being switched ON/OFF.

2. Description of the Related Art

Power supply circuits, each including a regulator capable of being switched ON/OFF, have been heretofore known. Japanese Patent Application Laid-open Publication No. H8-272461 has disclosed a power supply circuit including a standard voltage generator, a regulator, a low-pass filter connected between the standard voltage generator and the regulator.

The regulator in the power supply circuit includes a differential amplifier and a control transistor. To the differential amplifier, a reference voltage and a feedback voltage are inputted. The reference voltage is outputted from the standard voltage generator, and has a voltage value almost equal to that of a standard voltage. The feedback voltage is fed back from the output of the regulator. The control transistor is provided to the output of the differential amplifier. In addition, the low-pass filter is configured of a resistance and a capacitor. The resistance is connected in series between the standard voltage generator and the regulator. The capacitor is connected in parallel to the regulator between the standard voltage generator and the regulator.

In this power supply circuit, once the reference voltage is inputted to the differential amplifier from the standard voltage generator while the feedback voltage is inputted to the differential amplifier from the output of the power supply circuit, the differential amplifier compares the two voltages. On the basis of a result of the comparison, the differential amplifier controls the control transistor. Thus, the power supply circuit keeps its output voltage constant. In addition, the low-pass filter connected between the standard voltage generator and the differential amplifier inhibits a ripple voltage.

In a case where, however, the technique disclosed in Japanese Patent Application Laid-open Publication No. H8-272461 is applied to the power supply circuit capable of switching ON/OFF the differential amplifier in the regulator, the power supply circuit has a problem that a rush current is outputted from the regulator when the regulator is switched from OFF to ON.

Specifically, when the regulator is switched from OFF to ON while the standard voltage is outputted from the standard voltage generator, the reference voltage having the voltage value equal to that of the standard voltage is momentarily inputted to the differential amplifier in the regulator. That is because electrical charges have been already accumulated in the capacitor in the regulator.

On the other hand, when the regulator is switched from OFF to ON, the feedback voltage fed back from the output of the regulator to the differential amplifier is almost zero volts. For this reason, the differential amplifier which compares the reference voltage with the feedback voltage controls the control transistor so that the control transistor can flow a larger current. That is because the difference between the reference voltage and the feedback voltage is large. Accordingly, the rush current flows via the control transistor from the regulator to electronic parts and the like which are connected to the regulator.

This results in a problem that the electronic parts and the like which are connected to the regulator are damaged. Moreover, this invites a problem that the rush current decreases the voltage of a battery which supplies electronic power to the regulator and other equivalent voltages, so that the electronic parts malfunction. Incidentally, for the purpose of preventing a rush current, a technique for including an overcurrent limiter in a regulator has been known. Nevertheless, this technique brings about a problem of complicating the configuration of the regulator.

SUMMARY OF THE INVENTION

The present invention has been conceived of for the purpose of solving the foregoing problem. An object of the present invention is to provide a power supply circuit capable of preventing a rush current with ease.

An aspect of the present invention for achieving the foregoing object is a power supply circuit comprising, a standard voltage generator configured to generate a standard voltage, a regulator configured to control an output voltage by use of a reference voltage based on the standard voltage outputted from the standard voltage generator, and to be capable of being switched ON/OFF, a capacitor connected in parallel to the regulator between the standard voltage generator and the regulator; and a discharging circuit configured to discharge electrical charges from the capacitor while the regulator is in an OFF state.

In the aspect, the discharging circuit may comprise a first switch connected in series between the standard voltage generator and the regulator, and a second switch connected in parallel to the capacitor between the first switch and the capacitor, wherein the first switch is turned to an OFF state, and the second switch is turned to an ON state while the regulator is in an OFF state.

In the aspect, the capacitor may be included in a filter circuit.

In the aspect, the discharging circuit may be included in a buffer circuit.

In the aspect, the power supply circuit may comprise a voltage-variable circuit, connected between the standard voltage generator and the regulator, and configured to vary the standard voltage.

In the aspect, the voltage-variable circuit may comprise a first variable resistance connected in series between the standard voltage generator and the regulator, and a second variable resistance connected in parallel to the regulator between the standard voltage generator and the regulator.

Because the power supply circuit according to the present invention includes the capacitor connected in parallel between the standard voltage generator and the regulator as well as the discharging circuit for discharging electrical charges from the capacitor, the power supply circuit is capable of discharging electrical charges from the capacitor while the regulator is in the OFF state. This enables the reference voltage applied to the regulator to be gradually increased until the capacitor completes being charged with electrical charges, even though the regulator is switched from the OFF state to the ON state while the standard voltage is being outputted from the standard voltage generator.

Thereby, the regulator is capable of controlling the output voltage by use of the reference voltage thus gradually increased. This makes it possible to easily prevent a rush current which would otherwise be outputted from the regulator. Furthermore, the prevention of rush current makes it possible to check a voltage drop of the power supply which would otherwise be a supply source of the rush current when the regulator is switched from the OFF state to the ON state.

DETAILED DESCRIPTION OF THE INVENTION

Figure 1:
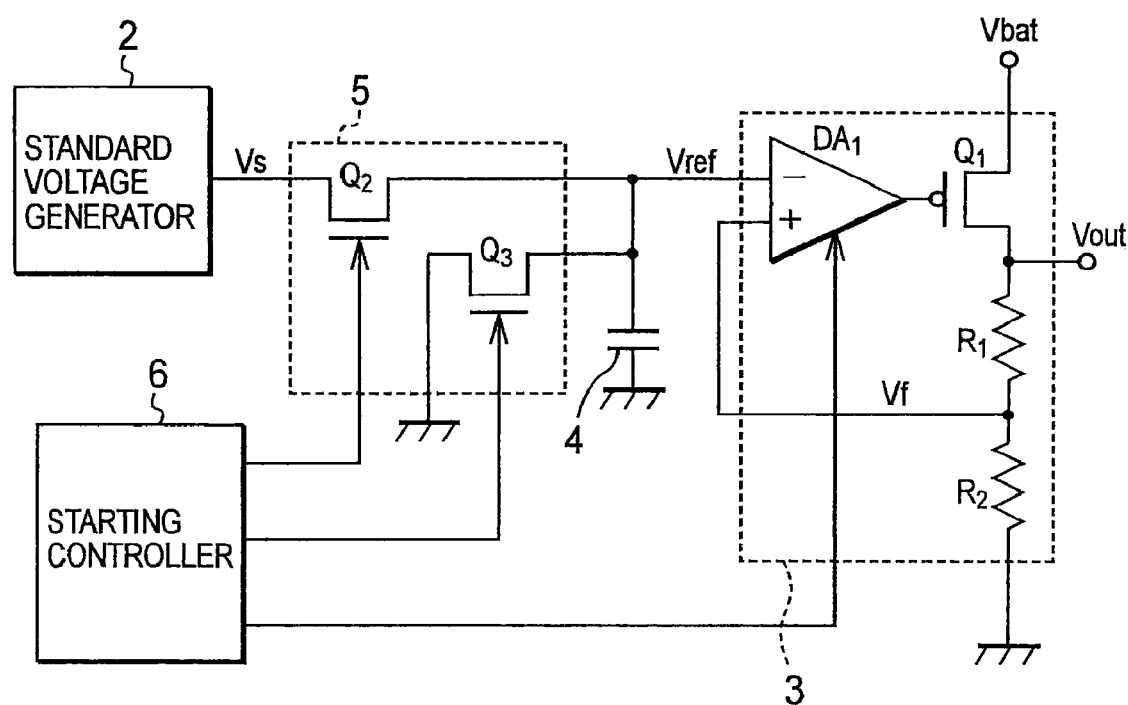
FIG. 1 shows a circuit configuration diagram of a power supply circuit according to a first embodiment.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail.

FIRST EMBODIMENT

Descriptions will be provided hereinafter for a first embodiment of the present invention by referring to the drawings.

FIG. 1 shows a circuit configuration diagram of a power supply circuit according to the first embodiment.

As shown in FIG. 1, a power supply circuit 1 includes a standard voltage generator 2, a regulator 3, a capacitor 4, a discharging circuit 5 and a starting controller 6.

The standard voltage generator 2 is configured of a BGR (bandgap reference) circuit, and generates/outputs a standard voltage Vs having a fixed voltage value.

The regulator 3, for keeping an output voltage Vout constant, is configured to be capable of being switched ON/OFF by a control signal from the starting controller 6. The regulator 3 includes a differential amplifier $DA_1$ capable of switching ON/OFF, a control transistor $Q_1$, and resistances $R_1$ and $R_2$.

The differential amplifier is configured to do the following things while the regulator 3 is in the ON state. A reference voltage Vref and a feedback voltage Vf are inputted to the differential amplifier $DA_1$. The reference voltage Vref is based on a standard voltage Vs outputted from the standard voltage generator 2. The feedback voltage Vf is obtained by dividing the output voltage Vout by the resistance $R_1$ and $R_2$, and is fed back. Thereafter, the differential amplifier $DA_1$ compares the reference voltage Vref with the feedback voltage Vf. On the basis of a result of the comparison, the differential amplifier $DA_1$ controls the control transistor $Q_1$ to which a battery voltage Vbat supplied from a battery (not illustrated) is inputted. Thereby, the differential amplifier $DA_1$ keeps the output voltage Vout constant.

The capacitor 4 is connected in parallel to the regulator 3 between the regulator 3 and a group of the standard voltage generator 2 and the discharging circuit 5. The capacitor 4 is configured to be capable of gradually increasing the reference voltage Vref by gradually charging itself with electronic charges when the regulator 3 is switched from the OFF state to the ON state once the regulator 3 discharges electronic charges which have been accumulated there while the regulator 3 is in the OFF state.

The discharging circuit 5 discharges electronic charges from the capacitor 4 while the regulator 3 is in the OFF state. The discharging circuit 5 includes a first transistor (to which a first switch according to claim 2 corresponds) $Q_2$ and a second transistor (to which a second switch according to in claim 2 corresponds) $Q_3$.

The first transistor $Q_2$ is connected in series between the standard voltage generator 2 and the regulator 3. The first transistor $Q_2$ is turned to the ON state by a control signal from the starting controller 2 while the regulator 3 is in the ON state. Thus, the first transistor $Q_2$ electrically connects the standard voltage generator 2 to the regulator 3 and the capacitor 4. In addition, the first transistor $Q_2$ is turned to the OFF state by a control signal from the starting controller 2 while the regulator is in the OFF state. Thus, the first transistor $Q_2$ cuts off the electrical connection between the standard voltage generator 2 and the group of the regulator 3 and the capacitor 4.

The second transistor $Q_3$ is connected in parallel to the capacitor 4 between the output of the first transistor $Q_2$ and the capacitor 4. The second transistor $Q_3$ is turned to the OFF state by a control signal from the starting controller 2 while the regulator 3 is in the ON state. Thus, the second transistor $Q_3$ cuts off the electrical connection between an electrode of the capacitor 4 closer to the regulator 3 and the ground potential in order that no electronic charges can be discharged from the capacitor 4. In addition, the second transistor $Q_3$ is turned to the ON state by a control signal from the starting controller 2 while the regulator 3 is in the OFF state. Thus, the second transistor $Q_3$ connects the electrode of the capacitor 4 closer to the regulator 3 to the ground potential in order that electrical charges can be discharged from the capacitor 4.

The starting controller 6 controls the differential amplifier $DA_1$ of the regulator 3 as well as the first and second transistors $Q_2$ and $Q_3$ of the discharging circuit 5 by switching ON/OFF these circuits.

Descriptions will be provided next for operations of the power supply circuit 1. It should be noted that it is assumed in the following description that the standard voltage generator 2 constantly outputs the standard voltage Vs.

First of all, in the case where the regulator 3 is in the ON state, the starting controller 6 turns the first transistor $Q_2$ of the discharging circuit 5 and the differential amplifier $DA_1$ of the regulator 3 to the ON state, and concurrently turns the second transistor $Q_3$ of the discharging circuit 5 to the OFF state. Thereafter, while in the ON state, the regulator 3 outputs the output voltage Vout which keeps having the constant voltage value corresponding to the reference voltage Vref and resistance $R_1$ and $R_2$ based on the standard voltage Vs outputted from the standard voltage generator 2, and concurrently on the basis of the feedback voltage Vf fed back from the resistances $R_1$ and $R_2$.

Subsequently, once the regulator 3 is switched from the ON state to the OFF state, the starting controller 6 turns the first transistor $Q_1$ of the discharging circuit 5 and the differential amplifier $DA_1$ of the regulator 3 to the OFF state. Concurrently, the starting controller 6 turns the second transistor $Q_3$ of the discharging circuit 5 to the ON state. This cuts off the electrical connection between the standard voltage generator 2 and the regulator 3. Thus, no output voltage Vout is outputted from the regulator 3. On the other hand, the electrode of the capacitor 4 closer to the regulator 3 is grounded, too, because the second transistor $Q_3$ of the discharging circuit 5 is in the ON state. Thus, electrical charges with which the capacitor 4 has been charged while the regulator 3 is in the ON state are discharged from the capacitor 4.

Thereafter, once the regulator 3 is switched from the OFF state to the ON state, the starting controller 6 turns the first transistor $Q_2$ of the discharging circuit 5 and the regulator 3 to the ON state. Concurrently, the starting controller 6 turns the second transistor $Q_3$ of the discharging circuit 5 to the OFF state. Thus, the capacitor 4 in which no electrical charge has been accumulated is gradually charged with electrical charges by the standard voltage Vs outputted from the standard voltage generator 2. For this reason, when the regulator 3 is switched to the ON state, the reference voltage Vref inputted to the regulator 3 instantaneously has a voltage value different from that of the standard voltage Vs. As the capacitor 4 is charged with electrical charges, the reference voltage Vref is gradually increased. Afterward, once the capacitor 4 completes being charged with electrical charges, the reference voltage Vref has a voltage value almost equal to that of the standard voltage Vs.

Consequently, while the differential amplifier $DA_1$ of the regulator 3 is comparing the reference voltage Vref with the feedback voltage Vf so that the differential amplifier $DA_1$ controls the control transistor $Q_1$, the difference between the two voltages Vref and Vf is small even though the differential amplifier $DA_1$ compares the reference voltage Vref with the feedback voltage Vf which has a lower voltage value when the differential amplifier $DA_1$ is switched to the ON state. For this reason, when the differential amplifier $DA_1$ is switched to the ON state, too, the differential amplifier $DA_1$ does not flow a larger current via the control transistor $Q_1$. The differential amplifier $DA_1$ controls the control transistor $Q_1$ in order that the current flowing from the differential amplifier $DA_1$ gradually becomes larger as the reference voltage Vref increases.

Because the power supply circuit 1 according to the first embodiment includes the capacitor 4 and the discharging circuit 5 as described above, electrical charges with which the capacitor 4 has been charged are capable of being discharged by the discharging circuit 5 while the regulator is in the OFF state. This makes it possible to input, to the regulator 3, the reference voltage Vref which is gradually increased as the capacitor 4 is charged with electrical charges when the regulator 3 is switched from the OFF state to the ON state.

Accordingly, this makes it possible to prevent the input to the regulator 3 of the reference voltage Vref which would otherwise have the voltage value equal to that of the standard voltage Vs, and to thus prevent a rush current which would otherwise flow from the regulator 3. Hence, this makes it possible to protect a stabilizing output capacitance and the like connected to the output of the regulator 3, which would otherwise be damaged. Moreover, the prevention of the rush current makes it possible to inhibit a voltage drop of the battery which would otherwise be a supply source of the rush current.

SECOND EMBODIMENT

Descriptions will be provided next for a power supply circuit according to a second embodiment obtained by modifying parts of the power supply circuit according to the first embodiment by referring to the drawings.

Figure 2:
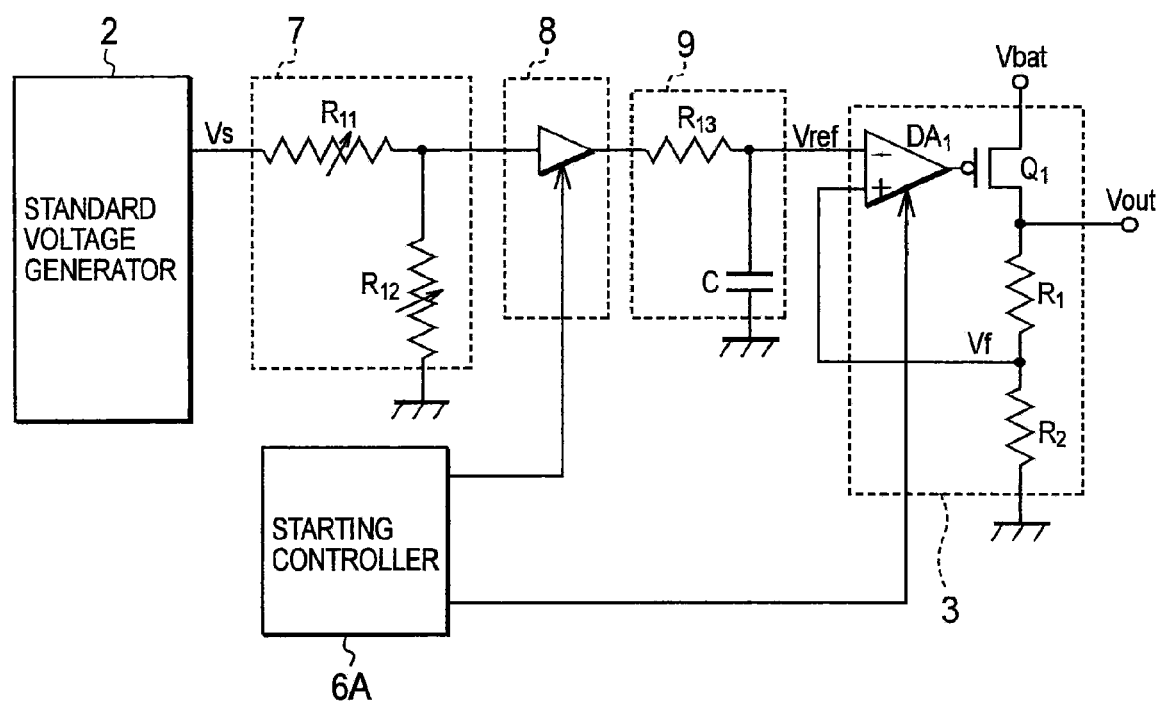
FIG. 2 shows a circuit configuration diagram of a power supply circuit according to a second embodiment.
Figure 3:
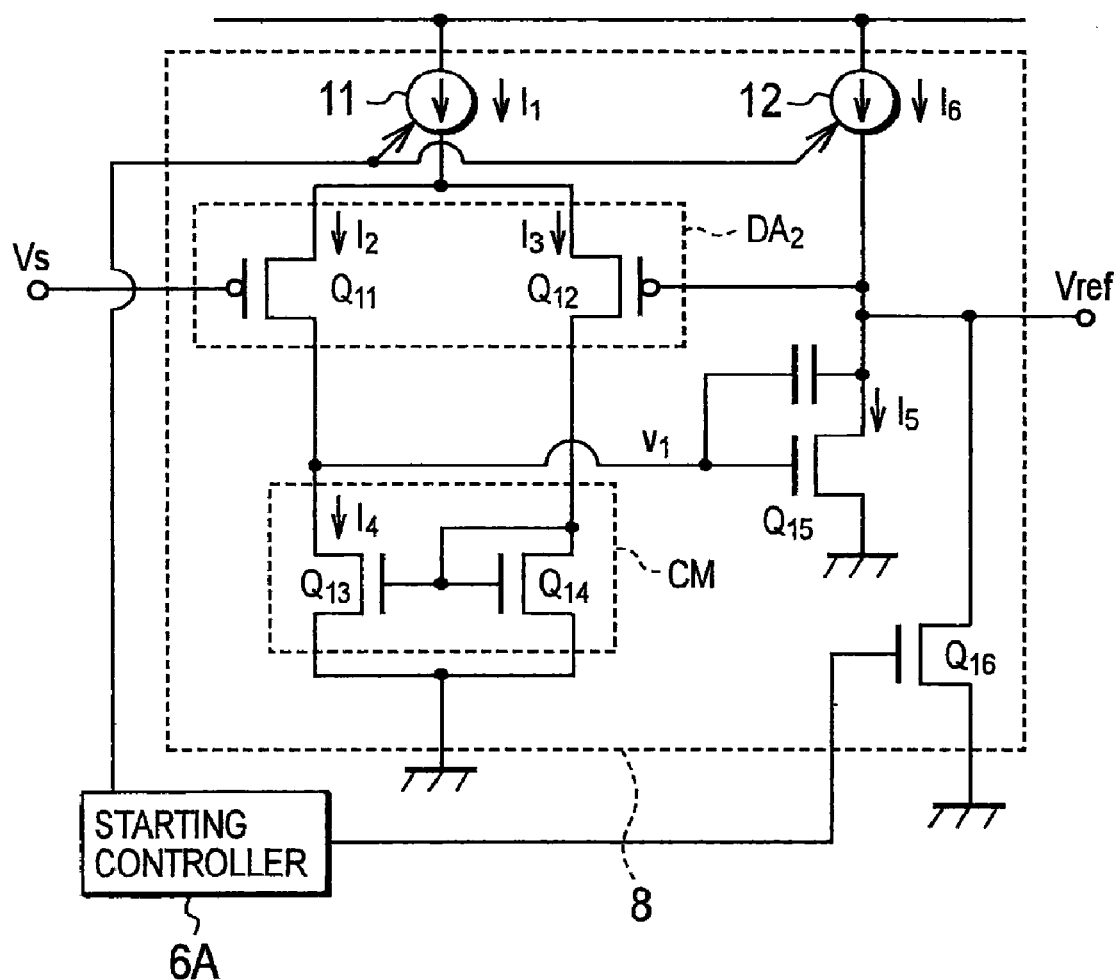
FIG. 3 shows a circuit configuration diagram of a buffer circuit in the power supply circuit according to the second embodiment.

FIG. 2 shows a circuit configuration diagram of the power supply circuit according to the second embodiment. FIG. 3 shows a circuit configuration diagram of a buffer circuit in the power supply circuit according to the second embodiment. It should be noted that, in the second embodiment, components which are the same as those of the first embodiment are denoted by the same reference numerals, and that the descriptions for those components will be omitted.

As shown in FIG. 2, a power supply circuit 1A includes a standard voltage generator 2, a regulator 3, a voltage-variable circuit 7, a buffer circuit 8 and a filter circuit 9.

The voltage-variable circuit 7 varies the standard voltage Vs, and is provided between the standard voltage generator 2 and the regulator 3. The voltage-variable circuit 7 includes variable resistances $R_{11}$ and $R_{12}$. The variable resistance $R_{11}$ is connected in series between the standard voltage generator 2 and a group of and the buffer circuit 8 and the regulator 3. The variable resistance $R_{12}$ is connected in parallel to the regulator 3 between a group of the standard voltage generator 2 and the variable resistance $R_{11}$ and a group of the buffer circuit 8 and the regulator 3. The voltage-variable circuit 7 is configured to be capable of varying the standard voltage Vs outputted from the standard voltage generator 2 with the variable resistances $R_{11}$ and $R_{12}$, and of thus controlling the reference voltage Vref. As described above, the changing of the reference voltage Vref which is going to be compared with the feedback voltage Vf by use of the differential amplifier $DA_1$ of the regulator 3 makes it possible to control the output voltage Vout which is going to be outputted from the regulator 3.

The buffer circuit 8 functions as a regular buffer circuit 8, and concurrently has a function discharging electrical charges from a capacitor C of the filter circuit 9 when the regulator 3 is turned to the OFF state as in the case of the discharging circuit 5 according to the first embodiment. As shown in FIG. 3, the buffer circuit 8 includes constant current sources 11 and 12, a differential amplifier $DA_2$, a current mirror circuit CM, a transistor $Q_{15}$ and a discharging transistor $Q_{16}$. The constant current source 11 and 12 causes constant currents $I_1$ and $I_6$ to flow out. The differential amplifier $DA_2$ is configured of a pair of transistors $Q_{11}$ and $Q_{12}$. The current mirror CM is configured of a pair of transistors $Q_3$ and $Q_{14}$.

The filter circuit 9 includes a resistance R13 and the capacitor C, and thus functions as a low-pass filter. In addition, as in the case of the capacitor 4 according to the first embodiment, the capacitor C is configured to do the following things. The capacitor C is gradually charged with electrical charges when the buffer circuit 8 and the regulator 3 are switched from the OFF state to the ON state. Thereby, the capacitor C increases the reference voltage Vref.

A starting controller 6A transmits an ON/OFF control signal to the buffer circuit 8 and the regulator 3. In a case where the buffer circuit 8 is going to be turned to the ON state, the starting controller 6A transmits an ON signal to the constant current sources 11 and 12, and concurrently transmits an OFF signal at the "L" level to the discharging transistor $Q_{16}$. In addition, in a case where the buffer circuit 8 is going to be turned to the OFF state, the starting controller 6A transmits an OFF signal to the constant current sources 11 and 12, and concurrently transmits an ON signal at the "H" level to the discharging transistor $Q_{16}$.

Descriptions will be provided next for operations of the power supply circuit 1 focusing on operations of the buffer circuit 8 and the filter circuit 9 by referring to FIGS. 2 and 3.

First of all, descriptions will be provided for how the power supply circuit 1 operates while the regulator 3 and the buffer circuit 8 are in the ON state. In the buffer circuit 8 which is in the ON state, the constant current sources 11 and 12 are turned to the ON state, and concurrently the discharging transistor $Q_{16}$ is turned to the OFF state. This makes it possible to keep the reference voltage Vref constant without respect to fluctuation in a current which is flowing to load closer to the output.

Specifically, as the reference voltage Vref increases, for example, after Vs=Vref, the gate potential of the transistor $Q_{12}$ becomes higher. For this reason, a current $I_3$ to flow to the transistor $Q_{12}$ of the differential amplifier $DA_2$ becomes larger. In this respect, a current $I2$ to flow to the transistor $Q_{12}$ on the differential amplifier $DA_2$ is expressed as:

$$I_2 = I_1 - I_3$$

where $I_1$ denotes a current flowing from the constant current source 11; and $I_2$ denotes the current flowing to the transistor $Q_{12}$. As understandable from this equation, as the current $I_3$ becomes larger, the current $I_2$ becomes smaller. In response to this, a current $I4$ to flow to the transistor $Q_{13}$ becomes smaller as well.

Because the source potential of the transistor $Q_{13}$ accordingly becomes lower, the gate potential $V_1$ of the transistor $Q_{14}$ becomes lower. Thereby, the source current $I_5$ to flow to the transistor $Q_{14}$ becomes smaller. As a result, the source potential of the transistor $Q_{15}$ becomes lower, and the reference voltage Vref accordingly decreases so that the reference voltage Vref is returned to the state of Vs=Vref. Thereby, the reference voltage Vref is kept constant.

Subsequently, the reference voltage Vref is compared with the feedback voltage Vf in the regulator 3. On the basis of the comparison, the control transistor Q1 is controlled, and thus the regulator 3 outputs the output voltage Vout which is kept at the constant voltage value.

Descriptions will be provided next for how the power supply circuit 1 operates when the regulator 3 and the buffer circuit 8 are in the OFF state. In the buffer circuit 8 which is in the OFF state, the constant current sources 11 and 12 are turned to the OFF state, and concurrently the discharging transistor $Q_{16}$ is turned to the ON state. This cuts off the electrical connection between the standard voltage generator 2 and the group of the filter circuit 9 and the regulator 3.

In addition, because the discharging transistor $Q_{16}$ is turned to the ON state, the reference voltage Vref becomes capable of being turned to the ground potential, and thus electrical charges with which the capacitor C has been charged become capable of being discharged from the capacitor C. This makes it possible to gradually charge the capacitor C with electrical charges, and to thus increase the reference voltage Vref gradually, when the regulator 3 and the buffer circuit 8 are switched from the OFF state to the ON state.

The power supply circuit according to the second embodiment as mentioned above also includes the capacitor C in the filter circuit 9 and buffer circuit 8 which is capable of discharging electrical charges from the capacitor C while the regulator 3 is in the OFF state. The power supply circuit according to the second embodiment is capable of bring about the same effect as the power supply circuit according to the first embodiment is.

In addition, the power supply circuit 1A according to the second embodiment has the configuration in which the capacitor C provided to the filter circuit 9 is capable of gradually increasing the reference voltage Vref. This enables the power supply circuit 1A according to the second embodiment to exhibit an effect as the filter 9 for doing things such as reducing noise while checking the power supply circuit 1A from being constructed in a bulky size and in a complicated configuration, and to bring about an effect similar to that of the power supply circuit according to the first embodiment.

Moreover, the buffer circuit 8 according to the second embodiment additionally plays the same function as the discharging circuit 5 according to the first embodiment does. This enables the power supply circuit 1A to exhibit an effect as the buffer circuit 8 for inhibiting change in the reference voltage Vref and thus converting impedance while checking the power supply circuit 1A from being constructed in a bulky size and in a complicated configuration, and to bring about an effect similar to that of the power supply circuit according to the first embodiment.

In addition, the inclusion of the voltage-variable circuit 7 enables the power supply circuit 1A to control the output voltage Vout outputted from the regulator 3. In addition, the capability of changing the standard voltage Vs enables the power supply circuit 1A to easily deal with the standard voltage generator 2 which outputs a different standard voltage Vs. Moreover, because the two variable resistances R11 and R12 are capable of realizing these effects, this makes it possible to check the power supply circuit 1A from being constructed in a bulky size and in a complicated configuration.

OTHER EMBODIMENTS

The present invention has been described in detail by use of the embodiments. It is clear, however, that the present invention shall not be limited to the embodiments which have been discussed in the description.

The present invention can be carried out through modification within the spirit and scope of the present invention which are determined by the description of the scope of the claims. In other words, what has been discussed in the present description is merely examples of the present invention, and shall not be construed as restricting the present invention in any particular manner. Descriptions will be provided below for modified embodiments obtained by modifying parts of the foregoing embodiments.

In the case of the power supply circuit according to the first embodiment, the transistor Q3 and the discharging transistor Q16 in the buffer circuit 8 are used as the switches for discharging electrical charges from the capacitors 4 and C. Instead, any other components may be used as the switches.

Furthermore, the voltage-variable circuit 7, the buffer circuit 8 and the filter circuit 9 may be included in the power supply circuit according to the first embodiment.

Moreover, the regulator 3, the discharging circuit 5, the voltage-variable circuit 7, the buffer circuit 8 and the filter circuit 9 are examples of the components included in the power supply circuit according to the present invention. The components may be substituted with any other circuits depending on the necessity.

What is claimed is:

1. A power supply circuit comprising:
   a standard voltage generator configured to generate a standard voltage;

a regulator configured to control an output voltage by use of a reference voltage based on the standard voltage outputted from the standard voltage generator, and to be capable of being switched ON/OFF;

a capacitor connected in parallel to the regulator between the standard voltage generator and the regulator;

a discharging circuit including a first switch and a second switch, and configured to discharge electrical charges from the capacitor via the second switch while the regulator is in an OFF state; and a starting controller configured to transmit a signal for controlling the first switch and the second switch, wherein the first switch is connected in series between the standard voltage generator and the regulator, the second switch has one end connected to a connection node between the first switch and the regulator, and has another end connected to a ground, the first switch is turned to an OFF state, and the second switch is turned to an ON state while the regulator is in an OFF state.

2. The power supply circuit of claim 1, wherein the capacitor is included in a filter circuit connected between the standard voltage generator and the regulator.

3. The power supply circuit of claim 1, wherein the discharging circuit is included in a buffer circuit, the signal from the starting controller controls ON/OFF switching of the buffer circuit.

4. The power supply circuit of claim 1, further comprising a voltage-variable circuit, connected between the standard voltage generator and the regulator, and configured to vary the standard voltage.

5. The power supply circuit of claim 4, wherein the voltage-variable circuit comprises:

a first variable resistance connected in series between the standard voltage generator and the regulator; and a second variable resistance connected in parallel to the regulator between the standard voltage generator and the regulator.

6. The power supply circuit of claim 3, wherein the first switch includes:

a differential amplifier configured to receive the standard voltage from the standard voltage generator; and a constant current source configured to be controlled by the starting controller, and to apply a constant current to the differential amplifier.

* * * * *